United States Patent [19]

Lutz et al.

[11] Patent Number: 5,553,695

[45] Date of Patent: Sep. 10, 1996

[54] FRICTION CLUTCH FOR A TRANSMISSION OF A MOTOR VEHICLE AND A FRICTION LINING FOR A FRICTION CLUTCH

[75] Inventors: Dieter Lutz; Franz-Josef Hörth, both of Schweinfurt; Hartmut Heide, Zeil; Hilmar Göbel, Grafenrheinfeld, all of Germany; Alan E. L. Littell, Sao Bernardo do Campo, Brazil; Josef Vonderau, Bad Neustadt, Germany; Armin Heid, Schweinfurt, Germany; Erich Scheer, Prosselsheim, Germany

[73] Assignee: Fichtel & Sachs AG, Schweinfurt, Germany

[21] Appl. No.: 322,771

[22] Filed: Oct. 13, 1994

[30] Foreign Application Priority Data

Oct. 15, 1993 [DE] Germany ............................ 43 35 208.1

[51] Int. Cl.[6] .................................................. F16D 13/64
[52] U.S. Cl. .................................... 192/70.14; 192/107 R; 192/107 C
[58] Field of Search .......................... 192/70.14, 107 R, 192/107 C, 113.2, 113.22

[56] References Cited

U.S. PATENT DOCUMENTS

| | | |
|---|---|---|
| 1,833,414 | 11/1931 | Cram ................................. 192/107 R |
| 2,222,507 | 11/1940 | Hunt . |
| 4,139,085 | 2/1979 | Kanbe et al. ...................... 192/107 R |
| 4,580,673 | 4/1986 | Graton ............................... 192/107 R |
| 5,085,307 | 2/1992 | Scheer ............................... 192/107 C |

FOREIGN PATENT DOCUMENTS

| | | |
|---|---|---|
| 0166640 | 1/1986 | European Pat. Off. . |
| 2712887 | 4/1978 | Germany ........................... 192/107 R |
| 3344443 | 6/1984 | Germany . |
| 3519245 | 12/1985 | Germany . |
| 4010543 | 10/1991 | Germany . |
| 4226763 | 3/1994 | Germany . |
| 2030242 | 4/1980 | United Kingdom ............... 192/107 R |

*Primary Examiner*—Richard M. Lorence
*Attorney, Agent, or Firm*—Nils H. Ljungman and Associates

[57] ABSTRACT

A friction clutch for a transmission of a motor vehicle generally will have a clutch disc, and the clutch disc will be provided with friction linings for engaging the friction clutch with a rotating engine flywheel. The friction rings can be provided, on both surfaces thereof with trough-shaped depressions, to reduce the weight of the clutch disc. The trough-shaped depressions can essentially be rectangular or square, with rounded corners and with connecting surfaces which are steeply diagonal, or curved with a large radius of curvature.

20 Claims, 5 Drawing Sheets

FRICTION CLUTCH FOR A TRANSMISSION OF A MOTOR VEHICLE AND A FRICTION LINING FOR A FRICTION CLUTCH

BACKGROUND OF THE INVENTION

1. Field of the Invention

This invention generally relates to a friction clutch for a transmission of a motor vehicle, wherein the friction clutch has a clutch disc. The invention also relates to a clutch disc for a friction clutch, wherein the clutch disc has friction linings. In general, a clutch disc can have a hub to be installed on a transmission shaft, which hub can rotate around an axis of rotation. To the hub can then be fastened lining supports, which can be fastened directly to the hub, or can be fastened with the interposition of a torsional damper, in which case the lining supports would typically be fastened to a cover plate of the clutch disc. These lining supports generally support a friction ring on each axial side thereof. Such friction rings will typically have a contact surface disposed towards the lining supports, a friction surface disposed away from the lining supports, an inner radial contour and an outer radial contour or circumference.

In order to fasten the friction rings to the lining supports, each friction ring can be provided both with passages which start at rivet head bases for fastening rivets between friction ring and lining holder, and also with openings for the passage of riveting tools for fastening of rivets of the opposing ring on the other side of the lining supports.

2. Background Information

Clutch plates of this type are disclosed, for example, in the Unexamined German Patent Application 40 10 543. It has been determined, however, that the friction rings of such known devices typically do not perform as well as expected. For example, it is essentially impossible in all situations to guarantee the required strength at high speeds of rotation.

OBJECT OF THE INVENTION

The object of the present invention, starting with the above-referenced devices, is to significantly improve the friction rings so that on one hand they have a satisfactory strength at high speeds of rotation, and on the other hand use as little friction material as possible.

SUMMARY OF THE INVENTION

The invention teaches that this object can be achieved by providing trough-shaped depressions in the friction rings, wherein each rivet head can then preferably be located in a trough-shaped depression. The depressions can preferably have a base portion which runs parallel to the friction surface, and the connecting surfaces between the base portion and the friction surface preferably run diagonally between the surface forming the base portion and the friction surface, or alternatively, can be configured to have a curved shape.

By providing such depressions for receiving the rivets therein, the savings in the weight and material of the friction rings are concentrated in the area of riveting. It has been found that even with large, trough-shaped depressions, the remainder of the friction surface suffices to guarantee an acceptable useful life. It is essential, however, that the connecting surfaces between the bases of the rivet heads and the friction surface are preferably substantially steeply inclined, or in another embodiment, preferably substantially curved with a large radius of curvature, so that there are as few discontinuities as possible in the outline of the friction ring. Such a precaution can sharply reduce the risk of destruction at high speeds.

The present invention also teaches that the peripheral area formed at the juncture between the connecting surfaces and the friction surfaces be self-contained. In other words, each trough-shaped depression should be surrounded on all sides by the friction surface. It can thereby essentially be provided that when the clutch is engaged, the friction ring will preferably not be subjected to a bending moment.

The surface of the rivet head base can thereby preferably be be made significantly larger than the surface of the rivet head. In addition, the peripheral area formed at the juncture between the rivet head bases and the connecting surfaces can preferably have a shape which is similar to the peripheral area at the juncture between the connecting surfaces and the friction surface. In this manner, the amount of friction material needed for a friction ring can be reduced by a relatively large amount. This makes possible a more economical manufacturing process and also reduces the weight of the friction ring.

The present invention also teaches that both peripheral areas, that is, the peripheral area at the juncture between the connecting surface and the friction surface, and the peripheral area at the juncture between the connecting surface and the rivet head base, preferably have an essentially square or rectangular shape, and that the corners thereof are preferably rounded. Such a shape can thus preferably provide a favorable load factor, both for the trough-shaped depressions and for the remaining friction surface.

The present invention also teaches that the two sides of the peripheral areas, which are separated by some circumferential distance, run essentially radially, and the two sides of the peripheral areas located radially above one another run in a preferably arc-like fashion around the axis of rotation. Such a configuration offers a good compromise between the volumetrically large, trough-shaped depressions to save weight and material on one hand, and a satisfactory, relatively large remaining friction surface on the other hand.

The present invention also teaches that on the contact surface of the friction rings, that is the surface disposed towards the lining support, there can also preferably be trough-shaped depressions which are located in the spaces reserved between the trough-like depressions in the friction surface. Such a configuration wherein the opposing depressions are located between one another, can essentially prevent overlapping of the trough-shaped depressions on the two sides of the friction rings. This means that there would preferably be no unnecessary increase in the load on the friction rings. By providing such depressions on both sides of the friction rings, it can be simultaneously possible to save additional material and to reduce the weight even further.

The present invention also teaches that the trough-shaped depressions, on both sides of the friction ring, preferably have similar geometric shapes. As such, all of the depressions should preferably have self-enclosed peripheral areas, as discussed above, with an essentially rectangular or square shape, with preferably rounded corners, and with sides which run essentially radially and at some circumferential distance from one another. The trough-shaped depressions on both sides can thereby run more or less seamlessly into one another in the circumferential direction.

The present invention also teaches that the radially-running sides of the peripheral areas of the trough-shaped depressions on both sides of the friction rings be preferably disposed at a minimum circumferential distance from one another. It can thereby be provided that the trough-shaped depressions do not overlap circumferentially, so that at least at this location between opposing depressions, the full thickness of the friction material is retained. In this area, therefore, it is directly possible to have an axial transmission of force over the entire thickness of the friction material.

The present invention also teaches that all of the fastening rivets can preferably be located on an intermediate radius and that the trough-shaped depressions can preferably be located in alternating fashion with one another over the circumference. In addition, the two radially overlapping sides of the peripheral areas preferably can be disposed at a slight distance from the contours of the friction rings. Such a configuration has, on the one hand, the advantage of significantly lower weight as a result of the depressions, and on the other hand, a relatively large contact area both on the friction side and also on the contact surface on the side facing the lining support. The risk of an uneven load when the clutch is engaged can thereby essentially be prevented.

In summary, one aspect of the invention resides broadly in a friction clutch, such as for a transmission for a motor vehicle, the friction clutch comprising: a housing; a clutch disc disposed within the housing, the clutch disc defining an axis of rotation and an axial direction parallel to the axis of rotation; pressure plate apparatus disposed within the housing and movable in the axial direction, the pressure plate apparatus for applying an axial force to the clutch disc along the axial direction; biasing apparatus for biasing the pressure plate apparatus in the axial direction to apply the axial force to the clutch disc; the clutch disc comprising: a hub, the hub comprising apparatus for engaging shaft apparatus of a transmission, and the hub having a diameter and a circumference; a hub disc disposed concentrically about the hub and extending radially away from the hub, the hub disc having a first side and a second side; at least one friction lining disposed with the hub disc for being engaged between the pressure plate apparatus and a rotating member of an engine, the at least one friction lining having a mass; and apparatus for supporting the at least one friction lining between the pressure plate apparatus and a rotating member of an engine; the at least one friction lining having a first surface for being engaged by one of: the pressure plate apparatus and a rotating member of an engine, and a second surface disposed opposite the first surface; at least one of the first surface and the second surface comprising a plurality of depressions therein; the depressions comprising a first portion within the friction lining, and the depressions comprising a second portion adjacent the at least one of the first surface and the second surface; the first portion having a cross-section; the second portion having a cross-section; the cross-section of the second portion being greater than the cross section of the first portion; and the depressions being of sufficient size to comprise apparatus for substantially reducing the mass of the friction lining.

Another aspect of the invention resides broadly in a friction lining for a clutch disc for a friction clutch, the friction lining comprising: a first surface for being engaged by one of: a pressure plate apparatus and a rotating member of an engine; a second surface disposed opposite the first surface; a plurality of depressions in at least one of the first surface and the second surface; the depressions comprising a first portion within the friction lining, and the depressions comprising a second portion adjacent the at least one of the first surface and the second surface; the first portion having a cross-section; the second portion having a cross-section; the cross-section of the second portion being greater than the cross section of the first portion; the second portion has a periphery; the at least one friction lining comprises surface portions within the depressions, the surface portions extending from the first portion of the depressions to the periphery of the second portion of the depressions; the periphery of the second portion comprising a juncture between the at least one of: the first surface and the second surface, and the surface portions within the depressions; and the surface portions are one of: substantially flat in a direction from the first portion of the depressions to the periphery of the second portion; and substantially convex in the direction from the first portion of the depressions to the periphery of the second portion, the surface portions being convex at least adjacent the periphery of the second portion.

BRIEF DESCRIPTION OF THE DRAWINGS

The invention is explained in greater detail below with reference to the embodiments illustrated in the accompanying drawings, in which:

FIG. 4 shows an alternative section through a friction ring; and

DESCRIPTION OF THE PREFERRED EMBODIMENTS

Figure 1:
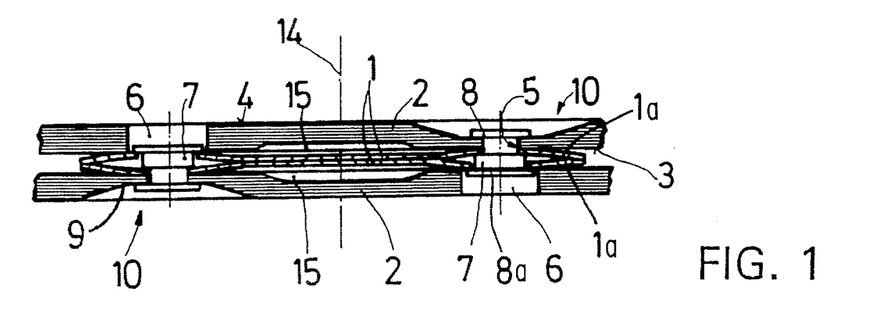
FIG. 1 shows a partial longitudinal section through a pair of lining supports with friction rings are attached by means of rivets.
Figure 1A:
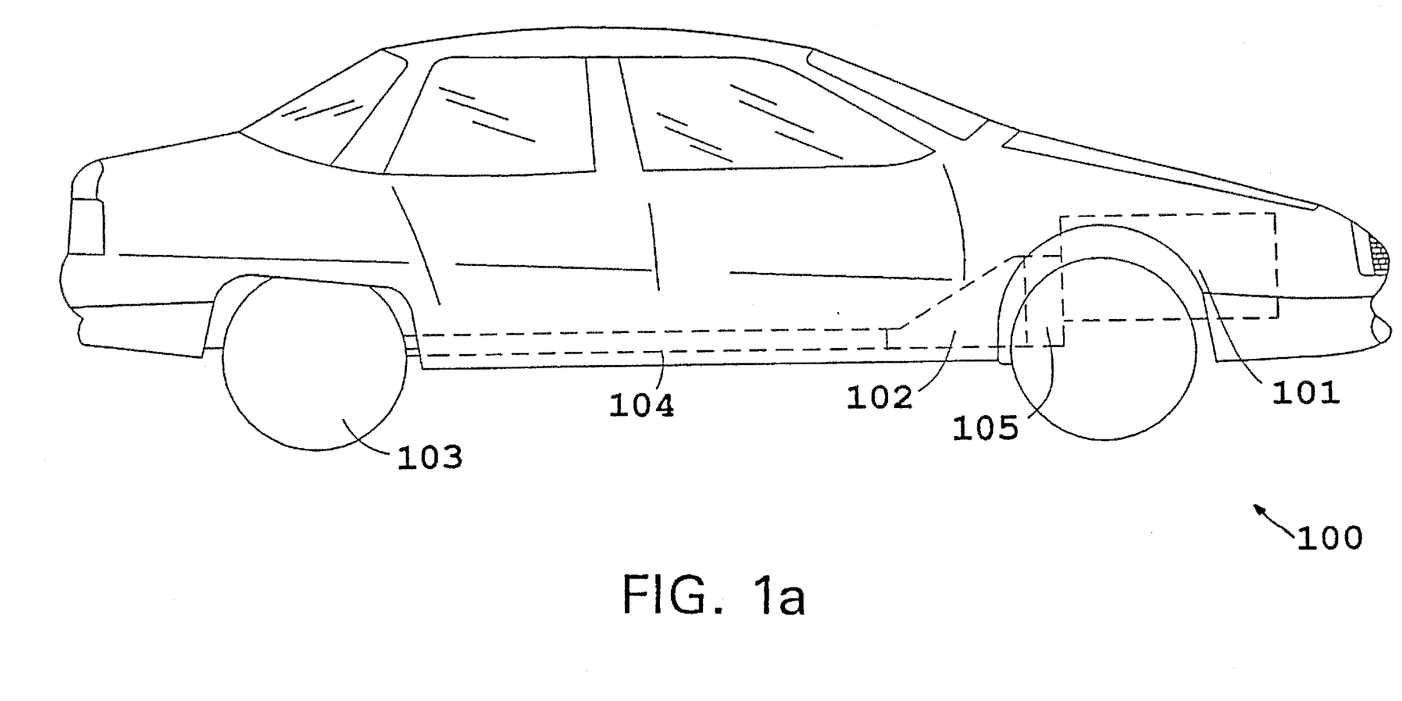
FIG. 1a shows a general depiction of a motor vehicle power train.

A depiction of a motor vehicle and corresponding power transmission components is shown in FIG. 1a, wherein the motor vehicle 100 could typically have an internal combustion engine 101 mounted in a forward portion thereof. The motor vehicle could also typically have a transmission 102 for transmission of mechanical power from the engine 101 to the rear vehicle wheels 103 via a drive shaft 104. A friction clutch 105 could preferably be provided, in accordance with the present invention for engaging the transmission 102 with the engine 101.

Figure 1B:
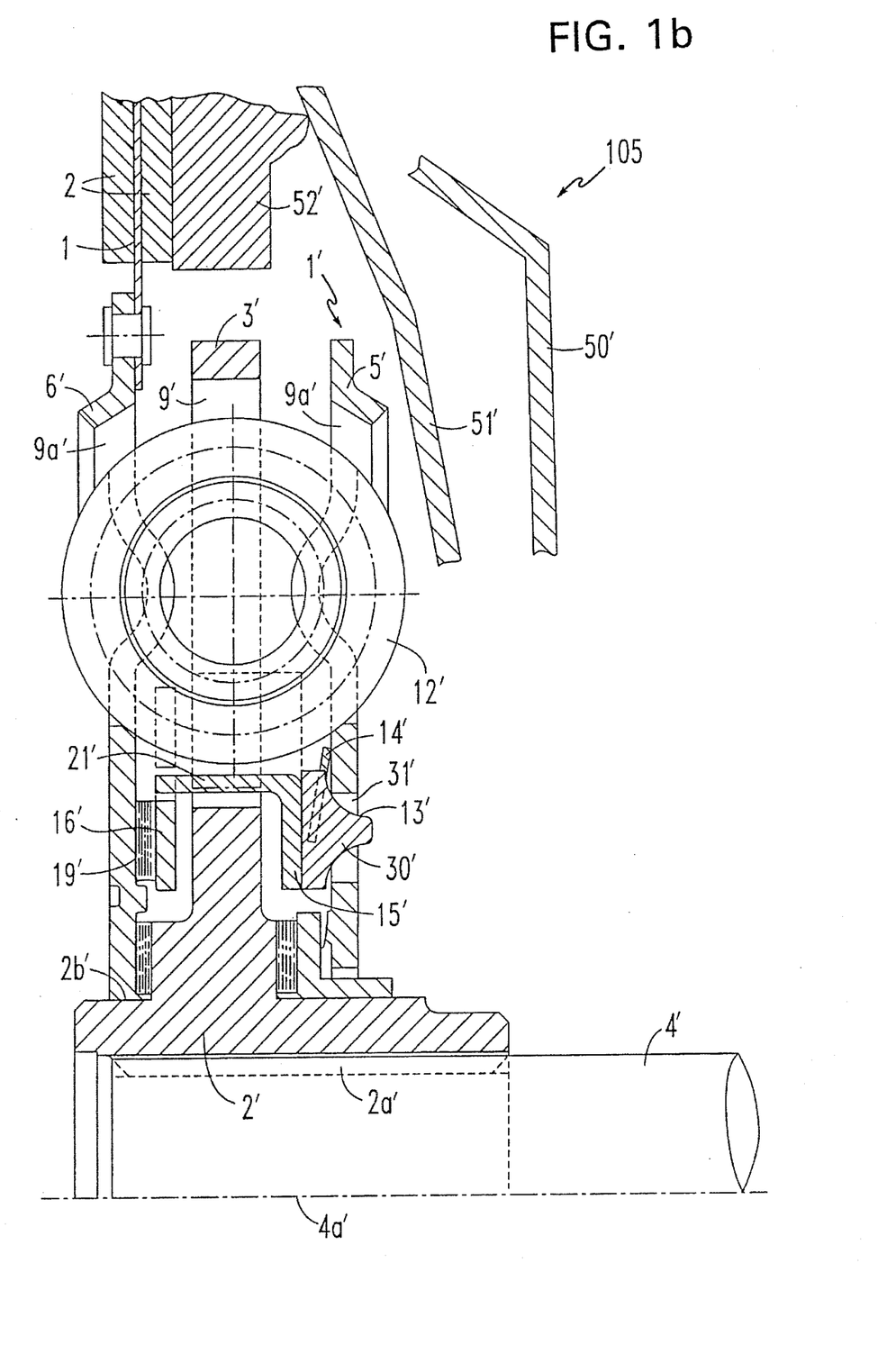
FIG. 1b shows a sectional view of a friction clutch.

As shown in FIG. 1b, a friction clutch 105 can generally have a clutch disc 1', which clutch disc 1' can have a hub 2' that can be configured to be mounted non-rotationally on a transmission shaft 4'. Such a mounting can be provided, for example, by means of a toothing 2a' disposed within the hub 2', which toothing 2a' would preferably be configured to correspond to similar toothing on the transmission shaft 4'. In general, the transmission shaft 4' defines an axis of rotation 4a', about which the hub 2' rotates.

As is also shown in partial section in FIG. 1b, the friction clutch could also preferably have a housing 50' for housing the components of the clutch therein. Within the friction clutch 105, the hub 2' of the clutch plate 1' can preferably be provided with a hub disc 3', which hub disc 3' can be integral with the hub 2', and which hub disc 3' can point radially outward from the hub 2'.

On both sides of the hub disc 3', cover plates 5' and 6' can preferably be provided, which cover plates 5' and 6' can be fixed in relation to one another, and held at an axial distance in relation to one another. At least one of the two cover plates, for example, the cover plate 6', as shown in FIG. 1b, in its radially outer region, can preferably have a lining support 1, to which friction linings 2 can be fastened. The two cover plates 5' and 6', for example, can preferably be guided in the radial direction, by means of a bore in one of the two cover plates 5', 6', on a cylindrical guide surface 2b' of the hub 2', as also shown in FIG 1b.

Within the housing 50' there could also preferably be a pressure plate device 52' for applying an axial force to the friction linings 2 to engage the linings 2 with a counterthrust plate (not shown) which would essentially be rotating with the engine, to thereby cause the hub disc 3' to also rotate with the engine and turn the shaft 4'. The pressure source for applying this axial pressure to the pressure plate device 52' could preferably be a biasing member, such as a spring device 51', which can bias the pressure plate away from the housing 50'. Such arrangements of pressure plate device 52', biasing members 51' and housing 50' are generally well known, and are therefore shown only schematically in the figures.

In the hub disc 3' there will typically be windows 9' in which windows coil springs 12' will generally be disposed. These coil springs 12' can essentially be disposed about the hub disc 3' over the same average diameter from the axis of rotation 4a', and can also essentially be uniformly placed about the circumference. Similar windows 9a' will typically be located in the cover plates 5' and 6' also for receiving the springs 12' therein.

As shown in FIG. 1b, radially inside the coil springs 12' and between the cover plates 5' or 6' and the hub disc 3', additional components can be provided. On the one side there can preferably be a friction ring 13' with lugs 30' that can be guided in openings 31' of the cover plate 5', a spring 14', and a control plate 15'. On the opposite side there can be a thrust ring 16' and a friction ring 19'. The control plate 15' and thrust ring 16' can preferably be held non-rotationally to one another and at an axial distance from one another, by means of axially-bent tabs 21', which can be provided on either one, or both parts.

It should generally be understood that the embodiments of the friction rings and lining supports as presented herebelow with reference to the remaining FIGS. 1–5, can preferably be interchangeable with the embodiment of the friction clutch as presented hereabove with reference to FIG. 1b.

FIG. 1 shows a partial longitudinal section through a clutch plate, or disc, whereby the section runs in an arc-like fashion around the axis of rotation 14 of the clutch plate and runs through two fastening rivets 7 installed on alternate sides of the plate. The figure shows two lining supports 1 which are preferably connected to the hub of a clutch plate, for example, in a manner such as the manner in which the lining supports 1 are attached to cover plate 6' as shown in FIG. 1b. The lining supports 1 preferably are disposed circumferentially about the clutch plate, at some radial distance from the axis of rotation 14 of the clutch plate, and perpendicular to the axis of rotation 14. In the respective circumferentially terminal areas of the lining supports 1, the lining supports 1 can preferably have wave crests, or corrugations 1a, which can be used to cushion engagement of two friction rings 2.

Axially outward, the two lining supports 1 can each preferably be provided with the friction rings 2. The friction rings 2 can preferably be connected to one another by means of a fastening rivet 7, which fastening rivet 7 preferably runs through a passage 5. The rivets 7 can preferably form a non-detachable connection to the corresponding lining support 1 by means of a rivet head 8, which holds the rivet 7 in place. The fastening rivet 7 preferably extends axially away from the rivet head 8, and can traverse an opening in the opposite lining support 1. On the other side of this opening, the rivet 7 can be engaged with a rivet head 8a.

The two fastening rivets 7 for a pair of lining supports 1 can preferably be installed in alternating fashion, so that on one hand, the one friction ring 2 is non-detachably connected to the one lining support 1, and the fastening rivet 7 on the opposite side is preferably located so that it can move in an opening 6 of the other friction ring and vice-versa. The two friction rings 2 are each in contact with a corresponding lining support 1 by means of a contact surface 3, with contact surfaces 3 of both rings 2 being disposed facing one another and closer to the lining support 1. Toward the axial outside, the friction rings 2 can have friction surfaces 4 which are each located farther from the lining support 1.

During the operation of a clutch disc, the friction rings 2 are axially braced between a flywheel (not shown) and a contact plate (as shown in FIG. 1b) during torque transmission, whereby the lining supports 1 with their wave crests, or corrugations 1a, are partly pressed together. The rivet heads 8a of the fastening rivets 7 in the openings 6 can then move toward the corresponding friction surface 4 by the dimension of this deflection.

Figure 2:
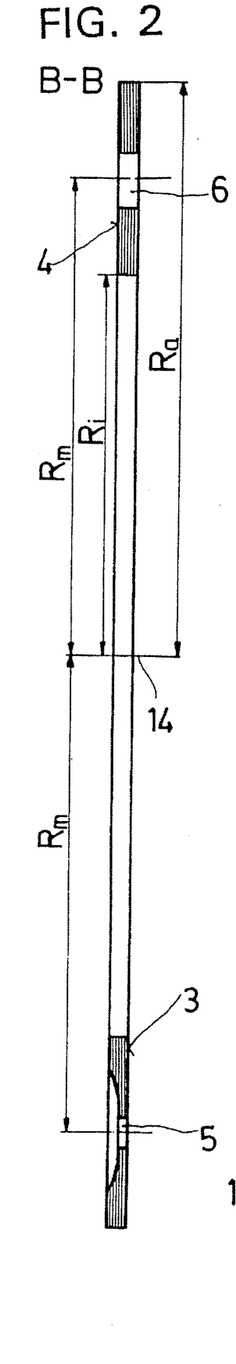
FIG. 2 shows a section of a friction ring taken along line B—B of FIG. 3.
Figure 3:
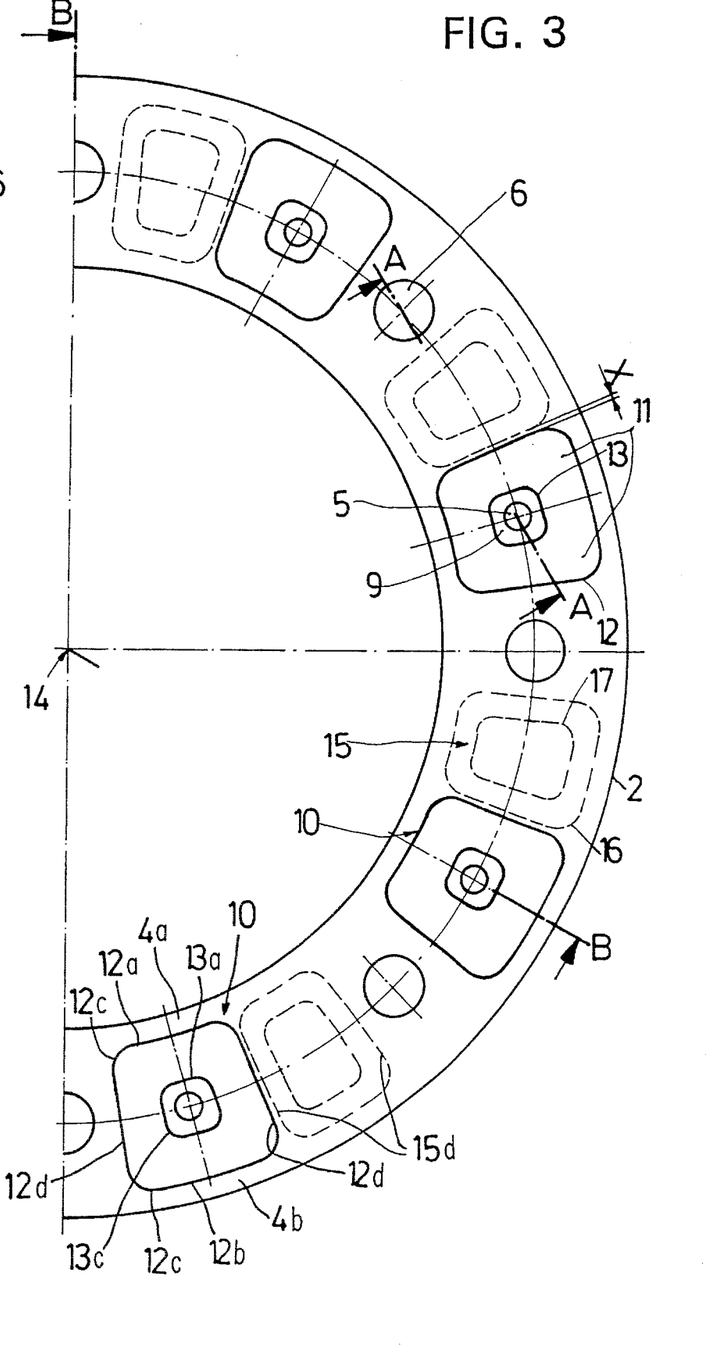
FIG. 3 shows a partial view of a friction ring as illustrated in FIG. 2.
Figure 4:
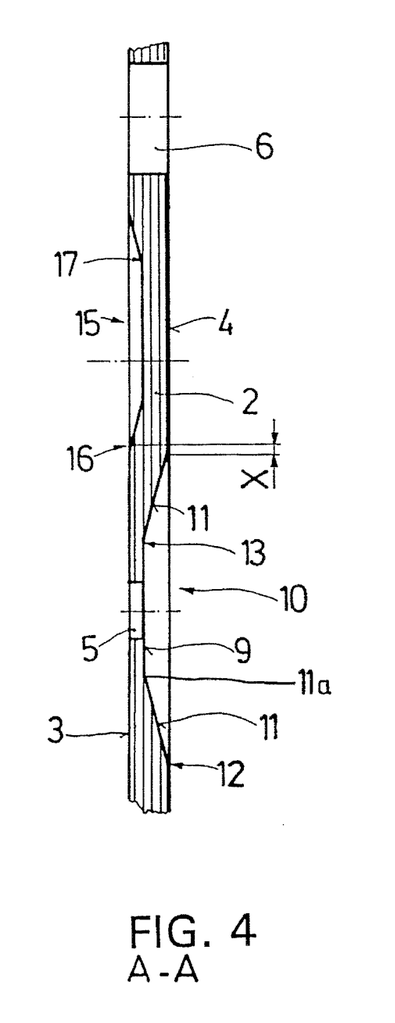
FIG. 4 shows a section through a friction ring along line A—A of FIG. 3.

In the embodiment illustrated in FIG. 1, there are shown two friction rings 2, and FIGS. 2 to 4 illustrate one preferred embodiment of a friction ring 2. As shown, a friction ring 2 can be considered to have an inner radius, or small contour $R_i$, and an outer radius, or large contour $R_a$. These two contours essentially can be considered to start at the axis of rotation 14, which is formed by the complete clutch plate and the friction rings 2. On an intermediate radius $R_m$, which can preferably lie essentially between the two contours $R_i$ and $R_a$, there are preferably passages 5 and openings 6 provided for fastening the friction rings 2 to the lining holders 1. The distribution of openings 5 and 6 over the circumference is illustrated in greater detail in FIGS. 3 and 4. FIG. 2 also shows the friction surface 4, and the contact surface 3 located on the opposite side of the friction ring 2, away from the friction surface 4.

As shown in particular in FIGS. 3 and 4, there are preferably trough-shaped depressions 10 and 15 respectively in the friction surface 4 and in the contact surface 3, while it might also be conceivable that only one of the sides 3 or 4 might have such depressions therein. In the depicted embodiment, the trough-shaped depressions 10 are in the friction surface 4 and are preferably somewhat concentric to the passages 5. As such, at the thinnest point of the friction ring 2, there is preferably a rivet head base 9 which runs parallel to the friction surface 4 or to the contact surface 3, and which is simultaneously the base of the rivet head. The rivet head 8 of the fastening rivet 7 generally comes into contact against this base 9 when the rivets 7 are installed, as shown in FIG. 1.

From the base 9, connecting surfaces 11 preferably extend radially outwardly from the passage 5, and can preferably run diagonally, and end at the friction surface 4. These connecting surfaces 11 preferably are disposed at a substantially large angle with respect to the base 9 and/or the friction surface 4. In at least one possible embodiment of the present invention, the angle formed between the base 9 and the connecting surface 11 could preferably be about 164 degrees, while the angle could alternatively range from between about 150 degrees to about 170 degrees, and could essentially be any value therebetween.

Figure 4A:
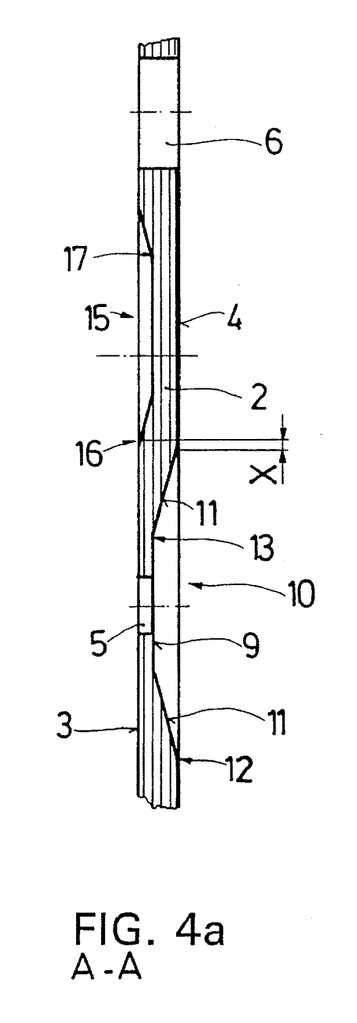

Alternatively, the connecting surfaces 11 can also be designed so that they run in the shape of a curve with a large radius, as shown in FIG. 4a. In at least one possible embodiment of the invention, the radius of curvature which is used could be at least about 15 cm, while the radius of curvature values could alternatively range from about 10 cm to as large as 25 cm, or even greater, and encompass essentially any value therebetween.

In each case, at the transition from the connecting surfaces 11 into the bases 9, there is preferably a rounded portion 11a, as shown in FIG. 4. At the transition from the base 9 into the connecting surfaces 11 and at the transition from the connecting surfaces 11 into the friction surface 4, there are respectively peripheral areas 13 and 12. These peripheral areas 12 and 13 can preferably be similar to one another geometrically and can preferably be designed so that toward the radial outside, and toward the radial inside, as shown in FIG. 3, strips 4a and 4b of the friction surface 4 remain, which strips 4a and 4b essentially are uniform about the entire friction ring 2. The peripheral areas 12 and 13 can also preferably be designed so that the two circumferentially separated sides 12a, 12b, 13a, 13b of the peripheral areas 12, 13 preferably run approximately radially and have rounded corners 12c and 13c. Thus, a smooth transition from the base 9 to the friction surface 4 can essentially be provided. Such a smooth transition will generally only negligibly weaken the structure of the friction ring 2, thereby preserving the structural strength, in particular with regard to the high speeds involved.

FIGS. 3 and 4 also show one preferred embodiment of where, and how the encircling depressions 15 can preferably be made in the contact surface 3. The depressions 15 can preferably have a shape which can preferably be similar to that of the depressions 10. As such, the radial edges 15d also run approximately radially outward, and can be oriented in relation to the radial edges 12d of the depressions 10 so that a minimum distance X can be provided circumferentially between the edges 12d and 15d. This minimum distance can, for example, in at least one embodiment of the present invention, be about 1 mm.

When lining supports as illustrated in FIG. 1 are used, on each friction ring 2, a depression 10 can preferably be followed by a depression 15, and then an area which has no depressions, but in which there is an opening 6 for the passage of a riveting tool to rivet a fastening rivet 7.

Figure 5:
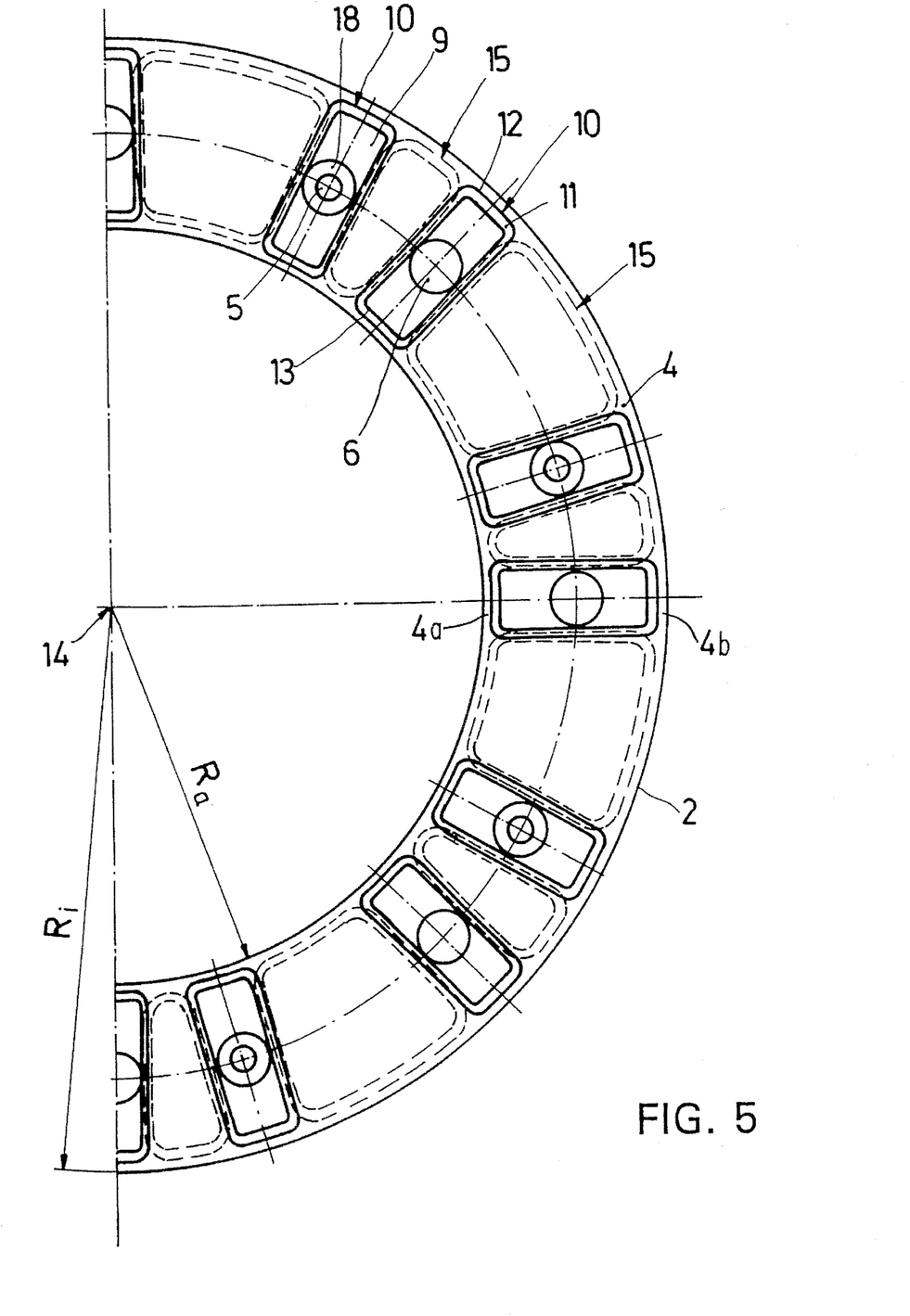
FIG. 5 shows a partial view of an additional embodiment of a friction ring.

A partial view of an alternative embodiment of a friction ring 2 is illustrated in FIG. 5. In FIG. 5, the depressions 10 in the friction surface 4 are made both in the vicinity of the passage 5 and also in the vicinity of the openings 6. Circumferentially between the trough-shaped depressions 10 in the friction surface 4, on the reverse side of the rings 2, or on the side of the contact surface 3 closer to the lining holder, there can also preferably be trough-shaped depressions 15, which essentially utilize any remaining circumferential spaces. The trough-shaped depressions 10 in the friction surface 4 thereby have an essentially rectangular shape, while the trough-shaped depressions 15 on the reverse side, which are separated circumferentially to match the depressions 10, can have borders which run somewhat radially. Each depression 10, 15 has a base 9 which runs parallel to the friction surface 4 and is offset therefrom into the thickness dimension of the ring 2. In this case, in the riveting area the rivet head base 18 can be set slightly lower than the base 9. But it is also possible to locate the rivet head base 18 and the base 9 in a common plane. The connecting surfaces 11 between the base 9 and the friction surface 4, with their peripheral areas 12 and 13, form the external shape of the depressions 10 and 15 described above. Thus there remains, radially outward and radially inward from the friction surface 4 in relation to the contour of the friction rings $R_i$ and $R_a$, respective continuous encircling partial areas of the friction surface 4.

The configurations as illustrated in FIGS. 1–5 essentially provide that the friction rings 2, in the vicinity of their contact with the lining holders 1, will have a continuous contact, albeit one interrupted by the openings 5 and 6, while the depressions 15 are located in the vicinity of the lining holders 1, which are not subject to any cushioning, or deflection. The depressions 10 on the side of the friction surfaces 4 are preferably provided in the vicinity of the fastening rivets 7, and all the depressions 10, 15 are preferably provided with diagonal surfaces and gradual transitions so that they do not cause any weakening of the structure. The reduction of the active friction surfaces by the depressions 10 has been found to be altogether acceptable while not shortening the useful life of such a clutch plate.

In the illustrated embodiment of FIGS. 2 and 3, the depicted friction ring 2 could, in essence, be considered to be proportionally correct in representing a friction ring. A typical friction ring 2 could have an exterior diameter ($R_a + R_a$) of about 228 mm, with an internal diameter ($R_i + R_i$) of about 152 nun, thereby providing a friction ring with a width of preferably about 38 mm. Of these 38 mm, the portions 4a and 4b which encircle the entire friction ring, could each preferably be about 4 mm. Thus, the radial length of the depressions 10 could preferably be about 29 mm and the depressions 10 could have a circumferential width adjacent the edge 12b of about 32 mm with a circumferential width adjacent the edge 12a of about 26 mm. The base 9 of the depressions 10 can have a radial length dimension of approximately 10 mm, with a circumferential width of approximately 10 mm. A thickness of the ring 2 could be about 4 mm, and thus the depth of the depressions 10 could be about 2 mm.

Using the above values, the volume of a depression 10 can be estimated at about 920 mm$^3$, and there can preferably be about 8 depressions 10 providing a total volume of about 7,360 mm$^3$. The total volume of the ring 2 could be about 90,700 mm$^3$. Thus, the volume, or mass, can be reduced by about 8% by simply providing the depressions 10. Similarly, the depressions 15 could possibly be configured to reduce the volume of the ring 2 by about 7%, so that by providing both depressions 10 and 15 in a friction ring, the amount of material needed for the ring could be reduced by about 15% of the amount if the depressions were not provided.

The values, as provided above, are meant as exemplary only for one possible embodiment of the friction rings in accordance with the present invention. By slightly enlarging the depressions, such as the depressions 15 in FIG. 5, a greater reduction in volume could be achieved, while slightly smaller depressions would yield a smaller reduction in volume.

During manufacture of such friction rings 2 in accordance with the present invention, the depressions 10 and 15, as well as the openings 5 and 6 can preferably be impressed into the friction ring 2. In one possible mode of manufacture, the material which will form the friction ring 2 could be placed in a mold, and a die member could then be impressed onto the surface of the mold to compress the material into the desired shape of the friction ring, and simultaneously form the depressions and openings therein during the compression stage. Thus, removal of material after formation of the rings 2 would not be necessary, and there would be no dust produced by any additional cutting or milling procedures, which dust, if the linings are formed at least partially of asbestos, can be very hazardous.

By providing a friction ring 2 with such depressions 10, 15 in accordance with the present invention, it might also be conceivable that, in at least one configuration of depressions 10, 15, that the heat generated at the friction rings 2 during engagement of the clutch, may be dissipated faster than if the depressions 10 and 15 were not present. This can conceivably occur due to the reduced thicknesses of the lining 2, a general increase in the overall exposed surface area of the lining 2, and because the depressions 10, 15 can form what might be considered air insulated spaces between the flywheel or pressure plate and the lining material at the base of the depressions 10, 15 thereby minimizing heat transmission from the metal flywheel, etc. to the friction ring 2.

In view of the above, it might also be conceivable that there would be reduced warpage of a friction ring 2 in accordance with at least one embodiment of the present invention. Thus, a greater proportion of the friction surfaces of the friction rings 2 can remain in contact with the opposite friction surfaces of the friction clutch. Thus, even though the present invention provides a reduced amount of contact surface on account of the depressions, a larger proportion of the available surface may remain usable if less warpage occurs. With less warpage, the generated heat of friction can be more uniformly distributed over the contact surfaces, thereby reducing extreme heating in certain areas of the friction rings 2. Such a more even heating, can also allow for a quicker heat dissipation, as localized "hot spots" might be eliminated, thereby allowing for a more even and therefore quicker heat dissipation.

One feature of the invention resides broadly in the clutch plate for a motor vehicle friction clutch, comprising a hub to be installed on a transmission shaft which can rotate around an axis of rotation, lining supports which are fastened directly or with the interposition of a torsional damper to the hub and which support a friction ring on each axial side, each with a contact surface closer to the lining support, a friction surface away from the lining support, an inner contour and an outer contour, whereby each friction ring is provided both with passages which start at rivet head bases for fastening rivets between friction ring and lining holder, and also with openings for the passage of riveting tools, characterized by the fact that each rivet head 8 is located in a trough-shaped depression 10 of the friction ring 2, which depression 10 has a base 9 which runs parallel to the friction surface 4, and the connecting surfaces 11 between the base 9 and the friction surface 4 run diagonally or on a curve.

Another feature of the invention resides broadly in the clutch plate, characterized by the fact that the base 9 and the rivet head base 18 are located in a plane.

Yet another feature of the invention resides broadly in the clutch plate, characterized by the fact that the connecting surfaces 11 run sharply diagonally or are curved with a large radius.

Still another feature of the invention resides broadly in the clutch plate, characterized by the fact that the peripheral area 12 formed by the connecting surfaces 11 and the friction surface 4 is self-enclosed.

Yet still another feature of the invention resides broadly in the clutch plate, characterized by the fact that between the individual portions of the peripheral area 12 running radially outward or radially inward and the internal $R_i$ or external contour $R_a$ of the friction ring 2, there is an encircling, circumferentially continuous friction surface area.

Still yet another feature of the invention resides broadly in the clutch plate, characterized by the fact that the areas of the connecting surfaces 11 running radially outward and radially inward run with their peripheral areas 12 in arc-like fashion around the axis of rotation 4.

Another feature of the invention resides broadly in the clutch plate, characterized by the fact that the peripheral area 12 has an essentially rectangular or square shape, with sides which run essentially radially at some circumferential distance, and the corners of which are rounded.

Still another feature of the invention resides broadly in the clutch plate, characterized by the fact that the openings 6 for the passage of riveting tools are also located in a trough-shaped depression 10.

Yet still another feature of the invention resides broadly in the clutch plate, characterized by the fact that in the contact surface 3 of the friction ring 2 closer to the lining support there are also trough-shaped depressions 15 which are located in the circumferential spaces between the trough-shaped depressions 10 of the friction surface 4.

Still yet another feature of the invention resides broadly in the clutch plate, characterized by the fact that the trough-shaped depressions 10, 15 on both sides of the friction rings 2 have geometrically similar shapes with self-enclosed peripheral areas 12, 16; 13, 17 which have an essentially rectangular or square shape with rounded corners, and with sides running essentially radially and separated by some circumferential distance.

Yet another feature of the invention resides broadly in the clutch plate, characterized by the fact that the sides which run radially of the peripheral areas 12, 16 of the trough-shaped depressions 1, 15 are at a minimum distance X from one another circumferentially.

Still another feature of the invention resides broadly in the clutch plate, whereby there are lining supports which, in their circumferentially terminal areas each have a wave crest, or corrugation, for the axial cushioning, or deflection of the friction rings, and in each wave crest there is a fastening rivet on an intermediate radius, characterized by the fact that each friction ring 2 has, in sequence circumferentially, an area with a trough-shaped depression 10 in the friction surface 4 and an area with a trough-shaped depression 15 in the contact surface 3, and the two friction rings 2 are installed so that the trough-shaped depressions 15 in the contact surface 3 are axially opposite one another.

Yet still another feature of the invention resides broadly in the clutch plate, characterized by the fact that all the trough-shaped depressions 10, 15 and the openings 5, 6 are impressed by a machining process which involves no cutting or removal of material.

Some examples of clutch discs and friction linings, which could have components interchangeable with the embodiments of the present invention are disclosed by the following U.S. Pat. Nos. 5,000,304 to Koch, Raab, Dotter and Ament, entitled "Clutch Disc"; 4,941,558 to Schraut, entitled "Clutch Disc"; 4,854,438 to Weissenberger and Huditz, entitled "Clutch Disc for a Friction Disc Clutch"; 4,741,423 to Hayen, entitled "Clutch Disc for a Friction Clutch"; and 4,715,485 to Rostin, Tomm and Hartig, entitled "Clutch Disc for a Motor Vehicle Friction Clutch".

Some examples of transmissions in which the present invention may possibly be incorporated are disclosed in the following U.S. Pat. Nos. 5,199,316 to Hoffman, entitled "Fully-Synchronized Multiple Speed Manual Transmission for Motor Vehicles"; 4,458,551 to Winter, entitled "Manual Transmission"; and 3,858,460 to Porter et al., entitled "Four Speed Manual Transmission and Control".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if any, described herein.

All of the patents, patent applications and publications recited herein, are hereby incorporated by reference as if set forth in their entirety herein.

The corresponding foreign patent publication applications, namely, Federal Republic of Germany Patent Application No. P 43 35 208.1, filed on Oct. 15, 1993, having inventors Dieter Lutz, Franz-Josef Hörth, Hartmut Heide, Hilmar Göbel, Alan E. L. Littell, Josef Vonderau, Armin Heid, Erich Scheer, and DE-OS P 43 35 208.1 and DE-PS P 43 35 208.1 are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A friction clutch, for a transmission for a motor vehicle, said friction clutch comprising:
   a housing;
   a clutch disc disposed within said housing, said clutch disc defining an axis of rotation and an axial direction parallel to said axis of rotation;
   pressure plate means disposed within said housing and movable in said axial direction, said pressure plate means for applying an axial force to said clutch disc along the axial direction;
   biasing means for biasing said pressure plate means in the axial direction to apply said axial force to said clutch disc;
   said clutch disc comprising:
      a hub, said hub comprising means for engaging shaft means of a transmission, and said hub having a diameter and a circumference;
      a hub disc disposed concentrically about said hub and extending radially away from said hub, said hub disc having a first side and a second side;
      at least one friction lining disposed concentrically about said hub and adjacent said hub disc, said at least one friction lining for being engaged between said pressure plate means and a rotating member of an engine;
      said at least one friction lining having a mass; and
      means for supporting said at least one friction lining between said pressure plate means and a rotating member of an engine;
   said at least one friction lining having a first surface for being engaged by one of:
      said pressure plate means and a rotating member of an engine, and a second surface disposed opposite said first surface;
   said first surface comprising a plurality of depressions therein;
   said depressions comprising a first portion within said friction lining, and said depressions comprising a second portion adjacent said first surface;
   said first portion having a cross-section;
   said first cross-section having an area;
   said second portion having a cross-section;
   said second cross-section having an area;
   said first cross-section having a diametral dimension, said first diametral dimension being disposed across said first portion, and said first diametral dimension being substantially parallel to said first surface;
   said second cross-section having a diametral dimension, said second diametral dimension being disposed across said second portion, and said second diametral dimension being substantially parallel to said first surface;
   said first cross-section area being disposed substantially parallel to said first surface;
   said second cross-section area being substantially parallel to said first surface;
   said second cross-section area being disposed about said first cross-section area;
   said cross-section area of said second portion being substantially greater than said cross-section area of said first portion;
   said second diametral dimension being substantially greater than said first diametral dimension;
   said depressions being of sufficient size to substantially reduce the overall mass of said friction lining in comparison to an identical friction lining without said depressions;
   said friction clutch further comprising:
      a plurality of rivets for fastening said at least one friction lining to said means for supporting; and
      said plurality of rivets each comprising a head portion, said head portion contacting its corresponding first portion of its corresponding depression.

2. The friction clutch according to claim 1, wherein:
   said depressions comprise trough-shaped depressions; and
   said second cross-section area being disposed about and surrounding said first cross-section area.

3. The friction clutch according to claim 2, wherein:
   said first portion comprises a base portion;
   said at least one friction lining comprises surface portions within said depressions;
   said base portion being adjacent to said surface portions; and
   said surface portions extending monotonically from their corresponding base portion to said first surface.

4. The friction clutch according to claim 3, wherein:
   said second portion has a periphery; said surface portions extending from said first portion of said depressions to said periphery of said second portion of said depressions;
   said periphery of said second portion comprising a juncture between said first surface and said surface portions within said depressions;
   said at least one friction lining having a strength; and
   said surface portions within said depressions being of a configuration to comprise means for substantially maintaining the strength of said at least one friction lining.

5. The friction clutch according to claim 4, wherein:

said cross section of said first portion has at least a first dimension taken along a first direction of the cross section, and said cross section of said second portion has at least a second dimension taken substantially parallel to said first dimension;

said first dimension being less than said second dimension; and said surface portions are one of:
  substantially flat in a direction from said first portion of said depressions to said periphery of said second portion; and
  substantially convex in the direction from said first portion of said depressions to said periphery of said second portion, said surface portions being convex at least adjacent said periphery of said second portion.

6. The friction clutch according to claim 5, wherein:

when said surface portions are said substantially flat surface portions, said substantially flat surface portions are disposed at a substantially large angle with respect to said first surface;

when said surface portions are said substantially convex surface portions, said substantially convex surface portions have a substantially large radius of curvature at least adjacent said periphery of said second portion; end said at least one friction lining further comprises a plurality of axial bores therethrough for listening said at least one friction lining to said means for supporting, said axial bores being disposed within said depressions.

7. The friction clutch according to claim 6, wherein:

said base portion of said first portion of said depressions comprise a substantially flat base portion, said substantially flat base portion defining a first plane;

said first surface defines a second plane;

said first plane being substantially parallel to said second plane;

said base portion comprises a periphery, said periphery of said base portion comprising a juncture of said surface portions and said base portion; and said surface portions extend substantially radially outwardly from said periphery of said base portion to said periphery of said second portion and define an essentially truncated, pyramidal surface disposed about each said depression.

8. The friction clutch according to claim 7, wherein:

said at least one friction lining defines a circumferential direction and a radical direction;

said periphery of said base portion and said periphery of said first portion define a substantially rectangular shape, with two first side portions spaced apart in the circumferential direction of said at least one friction line, and with two second side portions spaced apart in the radial direction of said at least one friction lining;

each of said first side portion adjoins each said second side portion to define a corner portion;

said corner portions comprise curved corner portions; and said curved corner portions and said first and second side portions of said periphery of said first portion of said depressions form a self-enclosed periphery of said first portion of said depressions.

9. The friction clutch according to claim 8, wherein:

said base portion comprises a portion for contacting said rivet means, said portion for contacting being in the first plane defined by said base portion;

said at least one friction lining has an inner edge disposed at a first radius from said axis of rotation, and an outer edge disposed at a second radius from said axis of rotation;

said first surface comprising a first circumferentially continuous planar friction surface adjacent said inner edge; and said first surface comprising a second circumferentially continuous planar friction surface adjacent said outer edge.

10. The friction clutch according to claim 9, wherein:

said two first side portions of both said base portion and said first portion of said depressions are disposed substantially radially with respect to said axis of rotation;

said two second side portions of both said base portion and said first portion of said depressions are substantially arc-shaped and are disposed substantially circumferentially about said axis of rotation;

both of said first surface and said second surface of said at least one friction lining comprise said depressions therein;

said depressions in said second surface are disposed between said depressions in said first surface;

said depressions in each surface being of geometrically similar shape, with said depression in said second surface being absent said axial bores; and said second surface being disposed in contact with said means for supporting.

11. The friction clutch according to claim 10, wherein:

said substantial angle comprises an angle of between about 150 degrees to about 170 degrees;

said substantial radius of curvature comprises a radius of curvature greater than substantially 10 cm;

said at least one friction lining has a thickness;

said first side portions of said depressions in said second surface are disposed a circumferential distance from said first side portions of said depressions in said second surface;

said circumferential distance defining an area between said first side portions of said depressions in said second surface and said first side portions of said depressions in said second surface, said area having the thickness of said at least one friction lining;

said depressions in said first side extend greater than substantially half-way through said thickness of said at least one friction lining; and said depressions in said second side extend less than substantially half-way through said thickness of said at least one friction lining;

said at least one friction lining comprises two friction linings, each of said two friction linings comprising said depressions in said first and second surfaces thereof;

both of said two friction linings having a second surface disposed in contact with said means for supporting;

one of said two friction linings having a first surface for being engaged by a rotating member of an engine, and the other of said two friction linings having a first surface for being engaged by said pressure plate means;

said two friction linings being disposed in attachment with said means for supporting, with said depressions in said second side of one of said friction linings being in substantial alignment with said depression in said second side of the other of said friction linings;

said means for supporting comprise pairs of metal plates disposed between said two friction linings;

said metal plates of each pair of metal plates being disposed adjacent a corresponding second surface of said friction linings, and each metal plate has first and second end portions spaced apart circumferentially;

said metal plates comprise a substantially flat portion between said first and second end portions;

said first and second end portions of each metal plate comprising a wave corrugation curved towards its adjacent second surface to dispose said adjacent second surface a spaced apart distance from said flat portions of said metal plates and provide an axial biasing between said two friction linings;

said rivet means have a first end for being disposed in said depressions, said first end comprising said rivet head, and a second end for being disposed at a metal plate;

said friction linings comprise an additional axial bore spaced apart a first distance from said axial bores in said depressions;

said additional axial bores being configured for receiving a riveting tool therein for riveting the other of said two friction linings to said metal plates;

said aligned depressions of said second surfaces being disposed between an axial bore and an additional axial bore and aligned with said flat portions of said metal plates;

said wave corrugations of said first and second end portions of said metal plates being disposed said first distance from one another to align said wave corrugations with said axial bores and said additional axial bores;

said base portion of said depressions of said second surface being disposed in the plane defined by said base portions of said depressions of said first surface;

said depressions of said first surface extending through said friction lining about ⅔ of the thickness of the friction linings and said depressions of said second surface extending through said friction lining about ⅓ of the thickness of the friction linings;

said friction linings have an initial mass, prior to the formation of said depressions, and said formation of said depressions will reduce said initial mass by at least substantially 15%;

said depressions, said axial bores and said additional axial bores comprise impressions into said friction linings;

said additional axial bores being also disposed in a depression in said first surface;

said friction lining comprises a mean radius between said first radius of said inner edge and said second radius of said outer edge;

said axial bores and said additional axial bores are disposed circumferentially about said friction linings along said mean radius;

said axial bores and said additional axial bores are disposed concentrically within said axial depressions;

said substantial angle comprises an angle of about 164 degrees;

said substantial radius of curvature comprises a radius of curvature of about 15 cm;

said area between said depressions of said first side and said depressions of said second side and having said thickness of said friction lining has a circumferential width of about 1 mm;

said first and second circumferentially continuous friction areas disposed adjacent said inner and outer edges have a radial width of about 4 mm;

said hub disc comprises a torsional damper, said torsional damper comprising a first cover plate, and a plurality of springs disposed circumferentially about said hub disc and interposed between said first cover plate and said hub disc for torsionally damping relative rotational movement between said cover plate and said hub disc; and said first cover plate being disposed in attachment with said metal plates for supporting said friction linings.

12. A friction lining for a clutch disc for a friction clutch, the friction clutch comprising: a housing, the clutch disc being disposed within the housing, the clutch disc defining an axis of rotation and an axial direction parallel to the axis of rotation, pressure plate means disposed within the housing and movable in the axial direction, the pressure plate means for applying an axial force to the clutch disc along the axial direction, biasing means for biasing the pressure plate means in the axial direction to apply the axial force to the clutch disc, the clutch disc comprising a hub comprising means for engaging shaft means of a transmission, and the hub having a diameter and a circumference, a hub disc disposed concentrically about the hub and extending radially away from the hub, the hub disc having a first side and a second side, and at least one said friction lining disposed concentrically about the hub and adjacent the hub disc, said at least one friction lining for being engaged between the pressure plate means and a rotating member of an engine, and means for supporting said friction lining between the pressure plate means and a rotating member of an engine; said friction lining comprising:

a first surface for being engaged by one of:
pressure plate means and a rotating member of an engine;

a second surface disposed opposite said first surface;

a plurality of depressions in said first surface and in said second surface;

said depressions comprising a first portion within said friction lining, and each said depression comprising a second portion adjacent its corresponding surface;

said first portion having a cross-section;

said first cross-section having an area;

said second portion having a cross-section;

said second cross-section having an area;

said first cross-section having a diametral dimension, said first diametral dimension being disposed across said first portion, and said first diametral dimension being substantially parallel to said first surface;

said second cross-section having a diametral dimension, said second diametral dimension being disposed across said second portion, and said second diametral dimension being substantially parallel to said first surface;

said first cross-section area being disposed substantially parallel to said first surface;

said second cross-section area being substantially parallel to said first surface;

said second cross-section area being disposed about said first cross-section area;

said cross-section area of said second portion being substantially greater than said cross section area of said first portion;

said second portion has a periphery;

said friction lining comprises surface portions within said depressions, said surface portions extending from said first portion of said depressions to said periphery of said second portion of said depressions;

each said periphery of said second portion comprising a juncture between its corresponding surface and its corresponding surface portions within each of said depressions; and said surface portions are one of:

substantially flat in a direction from said first portion of said depressions to said periphery of said second portion; and substantially convex in the direction from said first portion of said depressions to said periphery of said second portion, said surface portions being convex at least adjacent said periphery of said second portion;

said first portion of said depressions comprising a substantially flat base portion;

said depressions comprising a total volume;

said total volume comprising a first volume;

said friction lining comprising a friction lining material;

said friction lining material comprising a second volume;

said first volume being a substantial volume in comparison to said second volume; and said depressions thus substantially reducing the weight of said lining.

13. The friction lining according to claim 12, wherein:

said friction lining further comprises a plurality of axial bores therethrough for fastening said friction lining to the means for supporting said friction lining;

said depressions in said second surface are disposed between said depressions in said first surface;

said depressions in each surface being of substantially geometrically similar shape;

said depressions in said second surface being absent said axial bores; and said second surface being disposed in contact with said means for supporting.

14. The friction lining according to claim 13, wherein said friction lining further comprises:

rivet means;

said friction lining being attached to the means for supporting said friction lining with said rivet means;

said axial bores being disposed within at least a portion of said depressions on said first surface;

said rivet means being disposed within said axial bores; and said base portions of said at least a portion of said depressions, on said first surface having axial bores, each comprise a portion being in contact with its corresponding rivet.

15. The friction lining according to claim 14, wherein said friction lining has a strength, and further including:

said surface portions within said depressions being of a configuration to comprise means for substantially maintaining the strength of said friction lining.

16. The friction lining according to claim 15, wherein:

said cross section of said first portion has at least a first dimension taken along a first direction of the cross section, and said cross section of said second portion has at least a second dimension taken substantially parallel to said first dimension;

said first dimension being less than said second dimension;

when said surface portions are substantially flat surface portions, said substantially flat surface portions are disposed at a substantially large angle with respect to said at least one of said first surface and said second surface; and when said surface portions are substantially convex surface portions, said substantially convex surface portions have a substantially large radius of curvature at least adjacent said periphery of said second portion.

17. The friction lining according to claim 16, wherein:

said substantially flat base portion defines a first plane;

said at least one of said first surface and said second surface defines a second plane; and said first plane being substantially parallel to said second plane;

said base portion comprises a periphery, said periphery of said base portion comprising a juncture of said surface portions and said base portion; and said surface portions extend substantially radially outwardly from said periphery of said base portion to said periphery of said second portion and define an essentially truncated, pyramidal surface disposed about each said depression.

18. The friction lining according to claim 17, wherein:

said friction lining defines a circumferential direction and a radial direction;

said periphery of said base portion and said periphery of said first portion define a substantially rectangular shape, with two first side portions spaced apart in the circumferential direction of said friction lining, and with two second side portions spaced apart in the radial direction of said friction lining;

each said first side portion adjoins each said second side portion to define a corner portion;

said corner portions comprise curved corner portions; and said curved corner portions and said first and second side portions of said periphery of said first portion of said depressions form a self-enclosed periphery of said first portion of said depressions.

19. The friction lining according to claim 18, wherein:

said friction lining comprises an inner edge disposed at a first radius from said axis of rotation, and an outer edge disposed at a second radius from said axis of rotation;

said first surface comprising a first circumferentially continuous planar friction surface adjacent said inner edge;

said first surface comprising a second circumferentially continuous planar friction surface adjacent said outer edge;

said two first side portions of both said base portion and said first portion of said depressions are disposed substantially radially with respect to said axis of rotation;

said two second side portions of both said base portion and said first portion of said depressions are substantially arc-shaped and are disposed substantially circumferentially about said axis of rotation; and said at least one of said first surface and said second surface comprising said depressions comprises said first surface for being engaged by one of: said pressure plate means and a rotating member of an engine.

20. The friction lining according to claim 19, wherein:

said substantial angle comprises an angle of between about 150 degrees to about 170 degrees;

said substantial radius of curvature comprises a radius of curvature greater than substantially 10 cm;

said friction lining has a thickness;

said first side portions of said depressions in said first surface are disposed a circumferential distance from said first side portions of said depressions in said second surface;

said circumferential distance defining an area between said first side portions of said depressions in said first surface and said first side portions of said depressions in said second surface, said area having the thickness of said friction lining;

said depressions in said first surface extend greater than substantially half-way through said thickness of said friction lining; and said depressions in said second surface extend less than substantially half-way through said thickness of said friction lining;

said friction linings comprise an additional axial bore spaced apart a first distance from said axial bores in said depressions;

said additional axial bores being configured for receiving a riveting tool therein for riveting another said friction lining to said means for supporting;

said depressions of said second surfaces being disposed between an axial bore and an additional axial bore;

said base portion of said depressions of said second surface being disposed in the plane defined by said base portions of said depressions of said first surface;

said depressions of said first surface extending through said friction lining about ⅔ of the thickness of the friction linings and said depressions of said second surface extending through said friction lining about ⅓ of the thickness of the friction linings;

said friction lining has an initial mass, prior to the formation of said depressions, and said formation of said depressions will reduce said initial mass by at least substantially 15%;

said depressions, said axial bores end said additional axial bores comprise impressions into said friction lining;

said additional axial bores being also disposed in a depression in said first surface;

said friction lining comprises a mean radius between said first radius of said inner edge and said second radius of said outer edge;

said axial bores and said additional axial bores are disposed circumferentially about said friction lining along said mean radius;

said axial bores and said additional axial bores are disposed concentrically within said depressions;

said substantial angle comprises an angle of about 164 degrees;

said substantial radius of curvature comprises a radius of curvature of about 15 cm;

said area between said depressions of said first side and said depressions of said second side and having said thickness of said friction lining has a circumferential width of about 1 mm; and said first and second circumferentially continuous friction areas disposed adjacent said inner and outer edges have a radial width of about 4 mm.

* * * * *

UNITED STATES PATENT AND TRADEMARK OFFICE
CERTIFICATE OF CORRECTION

PATENT NO. : 5,553,695
DATED : September 10, 1996
INVENTOR(S) : Dieter LUTZ, Franz-Josef HÖRTH, Hartmut HEIDE, Hilmar GÖBEL, Alan E.L. LITTELL, Josef VONDERAU, Armin HEID and Erich SCHEER It is certified that error appears in the above-indentified patent and that said Letters Patent is hereby corrected as shown below:

On the title page, item [56], under the FOREIGN PATENT DOCUMENTS section, after '4226763', delete "3/1994" and insert --2/1994--.

In column 4, line 35, after 'FIG.', delete "4" and insert --4a--.

In column 8, line 32, after '152', delete "nun," and insert --mm,--.

In column 13, lines 27-28, Claim 6, after 'portion;', delete "end" and insert --and--.

In column 13, line 50, Claim 8, after 'a', delete "radical" and insert --radial--.

In column 20, line 8, Claim 20, after 'bores', delete "end" and insert --and--.

Signed and Sealed this

Eleventh Day of March, 1997

*Attest:*

BRUCE LEHMAN

*Attesting Officer*      Commissioner of Patents and Trademarks